United States Patent [19]
Zimmermann et al.

[11] Patent Number: 5,718,952
[45] Date of Patent: Feb. 17, 1998

[54] HOLLOW STRUCTURAL MEMBER

[75] Inventors: Werner Zimmermann, Putzbrunn; Hans-Friedrich Siegling, Egmating; Willi Martin, Reichertshausen; Klaus Drechsler, Westerham, all of Germany

[73] Assignee: Deutsche Aerospace AH, Munich, Germany

[21] Appl. No.: 323,620

[22] Filed: Oct. 17, 1994

[30] Foreign Application Priority Data

Oct. 20, 1993 [DE] Germany .................. 43 45 774.1

[51] Int. Cl.⁶ .............. F16L 11/00; F16L 11/15
[52] U.S. Cl. ............ 428/34.1; 428/36.9; 428/178; 428/188; 138/28; 138/30; 138/119; 138/148; 180/78; 180/311; 244/117 R; 137/383
[58] Field of Search .............. 138/26, 28, 30, 138/119, 148; 428/36.9, 36.91, 34.1, 178, 188; 180/DIG. 4, 311, 78; 244/117 R, 119; 137/383, 384.2

[56] References Cited

U.S. PATENT DOCUMENTS

| | | | |
|---|---|---|---|
| 3,201,861 | 8/1965 | Fromson et al. | 138/119 |
| 3,720,235 | 3/1973 | Schrock | 138/119 |
| 3,880,193 | 4/1975 | Lewis | 138/26 |
| 4,427,033 | 1/1984 | Ege | 138/103 |
| 4,650,471 | 3/1987 | Tamari | 138/119 |
| 4,651,781 | 3/1987 | Kandelman | 138/28 |
| 4,823,844 | 4/1989 | Bartholomew | 138/26 |
| 5,054,185 | 10/1991 | Usui et al. | 138/148 |

*Primary Examiner*—Rena Dye
*Attorney, Agent, or Firm*—Evenson McKeown Edwards & Lenahan, PLLC

[57] ABSTRACT

A stiff elongated hollow structural member has a double-walled structure in the shape of a tube made of an interior tube which has an annular cross-section and an exterior tube which has a different cross-section, in a concentric arrangement. The interior and exterior tubes bound a hollow space filled with an incompressible liquid. Responsive to pressure increases in the liquid, the exterior tube in the elastic material range is bendingly deformable in the direction of a ring-circular cross-section or to a ring-circular cross-section. This hollow structural member can be used as an adjustable stiffness torsion member such as a vehicle steering shaft. Another disclosed adjustable stiffness hollow structural member includes a flat plate facing a corrugated plate to form a hollow space for the incompressible liquid. Increases in pressure of the liquid forces the corrugated member to a more flattened configuration.

26 Claims, 2 Drawing Sheets

HOLLOW STRUCTURAL MEMBER

BACKGROUND AND SUMMARY OF THE INVENTION

This invention relates to an elastically bendable and/or torsionally flexible, elongated hollow structural member.

A hollow structural member of this type, for example, a motor vehicle steering shaft in a tube shape or a girder which is subject to bending and is part of a framework is normally unalterably designed for a certain rigidity. For the dimensioning and therefore for the structural weight, a maximum load is relevant which must not be exceeded; that is, in the case of a normal load, an overdimensioning will be accepted.

It is therefore an object of the invention to provide that it will be sufficient in the case of a hollow structural member of the initially mentioned type with respect to its rigidity, to use a dimensioning for a normal load also in the case of a maximum load.

This object is achieved according to the invention by providing an elongated hollow structural member comprising first and second walls which are spaced from one another to form a hollow space therebetween, and incompressible liquid filling the hollow space under pressure, wherein the first and second walls have different geometric configurations such that at least one of the walls is elastically deformable in response to pressure increases of the incompressible liquid in the hollow space, whereby rigidity of the structural component is reversibly adjustable by varying the pressure of the incompressible fluid in the hollow space.

In a first solution of the invention, the walls are made in the form of tubular members which define an annular hollow space between them for the incompressible liquid. The outer tubular member has an unstressed elliptical shape and the inner tubular member is cylindrical. The outer tubular member is elastically deformed toward a cylindrical configuration in response to increases in pressure of the liquid in the hollow space.

In a second solution of the invention, the hollow space is formed between a flat plate and a corrugated plate. The corrugated plate is elastically deformed toward a more flattened condition in response to increases in pressure of the liquid in the hollow space.

Both solutions are uniformly based on the idea of adapting the bending and/or the torsional rigidity of the hollow structural member to a change of the load by increasing the internal pressure of the liquid in the hollow space with the result of a reversible change of shape of the exterior wall which is not annular or of the plate which does not have a plane surface. This means that a hollow structural member according to the invention is variable and controllable in its rigidity. In this case, the control characteristic can advantageously be predetermined by the thickness of the exterior wall which is not annular or of the plate which does not have a plane surface and, when it is constructed from fiber reinforced material, also by the fiber alignment.

In the tubular arrangement, the interior of the inner tubular member can advantageously be used as a storage tank or reservoir for the liquid. The pressure in the liquid supplied to the hollow space is controlled by a control valve or control valves in conjunction with a pressurized storage tank and or pump and storage tank system for the liquid.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1A:
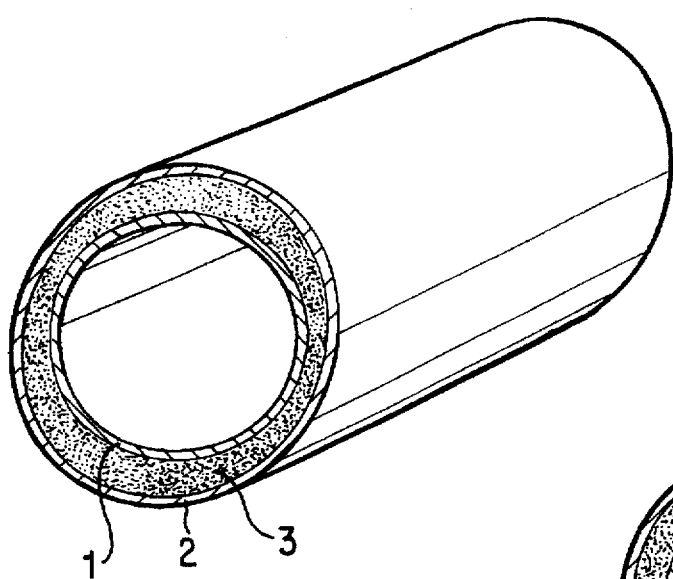
FIG. 1A is a perspective view of a section of a hollow structural member constructed as a double-walled tube arrangement according to a preferred embodiment of the invention, showing a first condition of torsional rigidity.
Figure 1B:
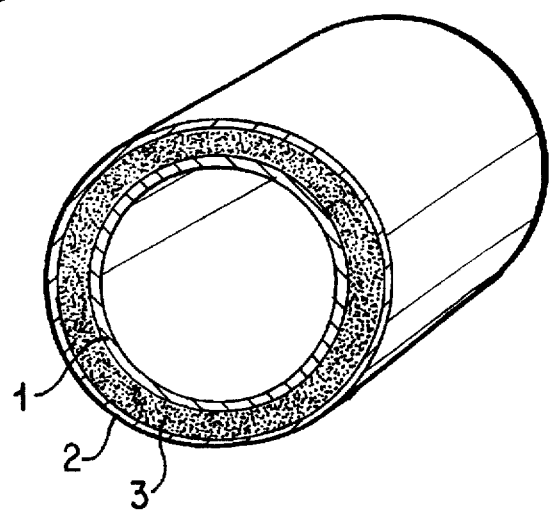
FIG. 1B is a view of the arrangement of FIG. 1A, showing a second condition of torsional rigidity.

According to FIGS. 1A and 1B, a torsion-proof tube, which can be used, for example, as a motor vehicle steering shaft, has a double-walled construction made of an interior tube 1 and an exterior tube 2 spaced away from it in a concentric arrangement. These tubes may consist, for example, of a metal, such as aluminum or of a fiber reinforced material, such as fiber reinforced plastic. In the unstressed condition of the tube illustrated on the left in FIG. 1A, only the interior tube 1 has an annular cylindrical cross-section; whereas the exterior tube 2 has an elliptic ring cross-section. The hollow space 3 between the interior tube 1 and the exterior tube 2 is filled with an incompressible liquid, such as silicon gel, thus with a liquid whose bulk modulus is as high as possible.

As illustrated in FIG. 1B, by means of a corresponding pressure increase of the liquid of the hollow space 3 by way of a supply of liquid enlarging the space volume thereof, the cross-section of the exterior tube 2 is caused to at least approach a cylindrical shape. This change of shape of the exterior tube 2 from the elliptic ring cross-section (FIG. 1A) to the cylindrical cross-section (FIG. 1B) takes place in the elastic material range of the exterior tube 2, is therefore reversible, and is necessarily connected with an increase of the torsional rigidity of the tube. As a result, by means of an apportioned change of the pressure of the liquid, a targeted adjustment of the torsional rigidity is possible, in which case this rigidity can be increased during the operation of the tube and is also reversibly changeable because the material of the exterior tube 2 is not plastically deformed by a pressure increase of the liquid, and the exterior tube 2 therefore remains resilient.

With respect to the two end faces of the interior and exterior tubes 1 and 2, which are not shown, depending on the function of the interior tube 1, the following configurations are possible: When the interior tube 1 is to operate as a pure displacement tube, it may be disposed by means of centering spacers in the exterior tube 2 which will then be closed on both sides. Alternatively, the interior tube 1 is fixedly connected, for example, welded to one side to the exterior tube 2, and forms a closed volume in itself. When the interior tube 1 is to operate as an additional torsion element, it is fixedly connected, for example, welded at both faces to the exterior tube 2.

Figure 3:
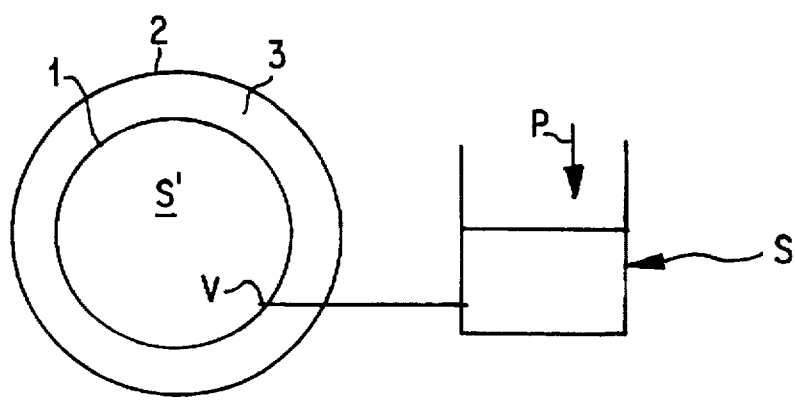
FIG. 3 schematically depicts a system for controlling the supply of liquid to and from the hollow space between the tubular members of FIGS. 1 and 2.

The pressure change or increase of the liquid in the hollow space 3 of the tube (consisting of the interior tube and the exterior tube 1, 2) is preferably achieved hydropneumatically. FIG. 3 schematically illustrates a system for controlling the pressure in hollow space 3. For example, via a valve V in the interior tube 1, liquid from a storage tanks can be supplied to the hollow space 3 by a pneumatic pressurization P of the liquid. Via the valve V, additional fluid is supplied under pressure into the hollow space 3 until the respective endeavored condition, that is, the respective desired increase of torsional rigidity is reached. Naturally, inversely, after a pressure increase with respect to the liquid, liquid can flow back into the storage tanks by means of a mere opening of the valve V and a pressure reduction with respect to the liquid in the hollow space can be caused, with the result of a cross-sectional change of the exterior tube 2 in the direction of the elliptic ring shape while the torsional rigidity of the tube decreases. The pneumatic pressurization P of the storage tank S will be correspondingly increased or decreased as needed to facilitate the change in fluid supply to and from space 3.

Therefore, even by means of a simple (not necessarily apportioning) valve, a change-over is possible between a high and a low torsional rigidity by means of the opening and closing of the valve V. High torsional rigidity when the valve is closed is achieved by the fact that, in the case of a forced torsion of the tube and a resulting reduction of the cross-sectional surface of the exterior tube 2, the liquid in the hollow space 3 cannot be displaced.

The resulting pressure buildup with respect to the liquid counteracts a change of the shape of the exterior tube 3. In contrast, the tube (consisting of the interior tube and the exterior tube 1, 2) seems "soft" when the valve is open. Accordingly, by means of an actively controllable valve V and pressurization P, a rapid change of the torsional rigidity of the tube can be caused in order to, depending on the application of the tube, dampen or stimulate, for example, vibrations.

It is understood that, according to the application of such a tube, its interior tube 1 or a limited section of the interior tube 1 may form the storage tank for the liquid (schematically depicted at S' in FIG. 3), and therefore a separate storage tank on the outside will not be necessary.

Figure 2A:
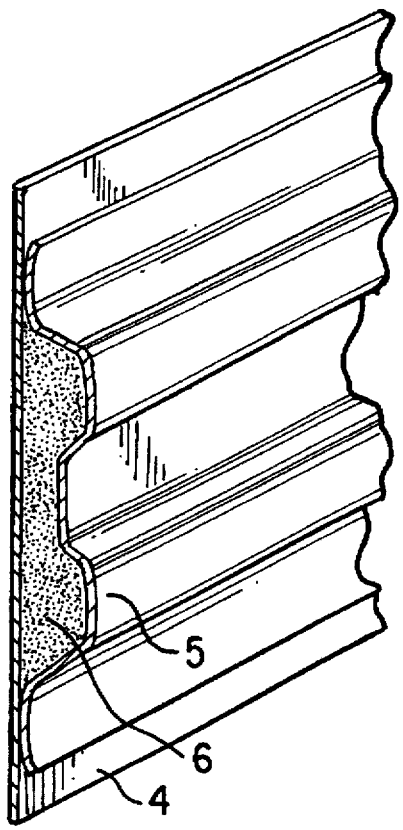
FIG. 2A is a perspective view of a section of a hollow structural member constructed as a double-walled rod arrangement according to another preferred embodiment of the invention, showing a first condition of bending strength.
Figure 2B:
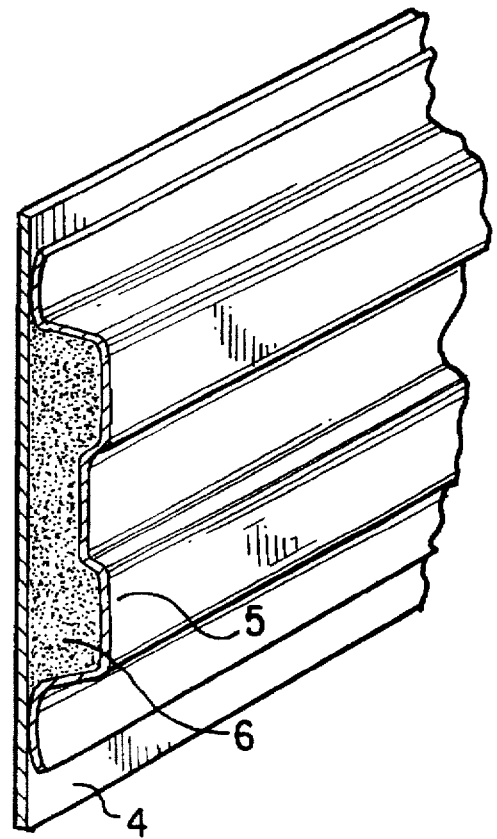
FIG. 2B is a view of the arrangement of FIG. 2A, showing a second condition of bending strength.

Finally, as illustrated in FIGS. 2A and 2B, preferred embodiments of the invention are not limited to a torsionally rigid tube or changes of torsional rigidity in the case of elongated hollow structural members. Structural members having the function of structural elements, for example, in an airplane construction, which have the shown rod shape or plate shape where bending strength is important are also taken into consideration. In this application, a double-walled structure made of two parallel plates 4 and 5 is provided, one plate 4 having a plane surface and the other plate 5 having a corrugated profile or the like in the transverse direction. In this case also, as in the case of the "tube" of FIGS. 1A and 1B, the hollow space 6 between the two plates 4, 5 is filled with an incompressible liquid by means of which, in the above-described manner, by means of a corresponding pressure increase, the corrugated-profile plate 5 can be deformed by bending in the elastic material range in the direction of or up to planeness. For this purpose, the left-hand representation in FIG. 2A again shows the starting position or the unstressed condition of the structural member, and the right-hand representation of FIG. 2B shows a condition of increased bending strength because of a pressure increase by the supply of liquid into the hollow space 6 with the result of a profile change of the plate 5. The pressure rise increases the steepness of the plate flanks and therefore correspondingly the bending strength (analogously to the method of operation of the T-beam). A prerequisite for the increase of the flank steepness is the corrugated profiling of the plate which is parallel to the plate flanks.

The control of the liquid pressure and volume in space 6 of the embodiments of FIGS. 2A and 2B can be the same as described above for the embodiments of FIGS. 1A and 2B. The configuration possibilities on the end faces mentioned with respect to the "tube" embodiment naturally also apply for this "rod or plate" embodiment according to the invention. For example, the members 4 and 5 can be connected by welding at their end faces to form a closed volume.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An elongated structural component comprising, first and second walls which are spaced from one another to form a hollow space therebetween, and incompressible liquid filling the hollow space under pressure, wherein the first and second walls have different geometric configurations such that at least one of the walls is elastically deformable in response to pressure increase of the incompressible liquid in the hollow space, whereby rigidity of the structural component is reversibly adjustable by varying the pressure of the incompressible fluid in the hollow space, wherein the first wall is a planar plate member and wherein the second wall is a non-planar plate member which faces the planar plate member and bounds the hollow space between the planar plate member and non-planar plate member, said non-planar plate member being elastically deformable such that its non-planar shape is forced toward a planar shape in response to increases in pressure in the liquid in the hollow space to thereby increase the rigidity of the structural component.

2. A structural component according to claim 1, wherein said non-planar plate member is a corrugated plate member which is attached to the plate member along longitudinally extending edges.

3. A structural component according to claim 1, comprising means for increasing the pressure of the liquid in the hollow space in an apportioned manner.

4. An elongated structural component comprising:

first and second walls which are spaced from one another to form a hollow space therebetween, incompressible liquid filling the hollow space under pressure, and pneumatic pressurizing means for controllably pressurizing the liquid in the hollow space, wherein the first and second walls have different geometric configurations such that at least one of the walls is elastically deformable in response to pressure increase of the incompressible liquid in the hollow space, whereby rigidity of the structural component is reversibly adjustable by varying the pressure of the incompressible fluid in the hollow space.

5. A structural component according to claim 4, wherein the first wall is a hollow cylindrical tube and wherein the second wall is a non-cylindrical hollow tube which surrounds the cylindrical tube at a spacing to form said hollow space between the tubes, said non-cylindrical hollow tube being elastically deformable toward a cylindrical configuration in response to increases in the pressure of the liquid in the hollow space to thereby increase the rigidity of the structural component.

6. A structural component according to claim 5, wherein the second wall is an elliptically shaped tube when in an initial position not subject to internal pressure.

7. A structural member according to claim 5, wherein the hollow cylindrical tube forms a storage tank for the liquid.

8. A structural member according to claim 4, wherein said hollow structural member is a motor vehicle steering shaft which is subjected in use to torsional flexing.

9. A structural member according to claim 4, wherein said hollow structural member is an airplane frame member which is subjected in use to flexible bending.

10. An elongated structural component comprising:
first and second walls which are spaced from one another to form a hollow space therebetween,
incompressible liquid filling the hollow space under pressure, and
a storage tank and a valve for controlling supply of pressurized liquid to the hollow space,
wherein the first and second walls have different geometric configurations such that at least one of the walls is elastically deformable in response to pressure increase of the incompressible liquid in the hollow space, whereby rigidity of the structural component is reversibly adjustable by varying the pressure of the incompressible fluid in the hollow space.

11. A hollow structural member according to claim 10, wherein the liquid can be returned via the valve from the hollow space into the storage tank.

12. A hollow structural member according to claim 10, wherein the liquid can be selectively alternately supplied to the hollow space and returned from the hollow space to the storage tank via the valve.

13. An elongated structural component assembly, having reversably variable rigidity, comprising:
first and second walls which are spaced from one another to form a hollow space therebetween,
incompressible fluid filling the hollow space under pressure,
and pressure varying means for varying the pressure of said fluid,
wherein the first and second walls have different geometric configurations such that at least one of the walls is elastically deformable in response to pressure changes in the fluid in the hollow space, whereby rigidity of the structural assembly is reversibly adjustable by varying the pressure of the fluid in the hollow space,
wherein the first wall is a planar plate member and wherein the second wall is a non-planar plate member which faces the planar plate member and bounds the hollow space between the planar plate member and non-planar plate member, said non-planar plate member being elastically deformable such that its non-planar shape is forced toward a planar shape in response to increases in pressure in the fluid in the hollow space to thereby increase the rigidity of the hollow structural component.

14. A hollow structural component assembly according to claim 13, wherein said non-planar plate member is a corrugated plate member which is attached to the member along longitudinally extending edges.

15. An elongated structural component assembly, having reversably variable rigidity, comprising:
first and second walls which are spaced from one another to form a hollow space therebetween,
incompressible fluid filling the hollow space under pressure,
and pressure varying means for varying the pressure of said fluid,
wherein the first and second walls have different geometric configurations such that at least one of the walls is elastically deformable in response to pressure changes in the fluid in the hollow space, whereby rigidity of the structural assembly is reversibly adjustable by varying the pressure of the fluid in the hollow space,
wherein said fluid is an incompressible liquid, and
wherein said pressure varying means includes pneumatic pressurizing means for controllably pressurizing the liquid in the hollow space.

16. A structural component assembly according to claim 15, wherein the first wall is a hollow cylindrical tube and wherein the second wall is a non-cylindrical hollow tube which surrounds the cylindrical tube at a spacing to form said hollow space between the tubes, said non-cylindrical hollow tube being elastically deformable toward a cylindrical configuration in response to increases in the pressure of the fluid in the hollow space to thereby increase the rigidity of the hollow structural component.

17. A hollow structural component assembly according to claim 16, wherein the second wall is an elliptically shaped tube when in an initial position not subject to internal pressure of the fluid.

18. A hollow structural component assembly according to claim 15, wherein said incompressible liquid is silicon gel.

19. An elongated structural component assembly having reversibly variable rigidity, comprising:
first and second walls which are spaced from one another to form a hollow space therebetween,
incompressible fluid filling the hollow space under pressure,
and a pressure changer operable to selectively vary the pressure of said fluid,
wherein the first wall is a hollow cylindrical tube which maintains a cylindrical shape independently of the fluid pressure in the hollow space, and
wherein the second wall is a non-cylindrical hollow tube which surrounds the cylindrical tube at a spacing to form said hollow space between the tubes when said fluid is unpressurized, said non-cylindrical hollow tube being elastically deformable toward a cylindrical configuration in response to increases in the pressure of the fluid in the hollow space to thereby increase the rigidity of the hollow structural component.

20. An assembly according to claim 19, wherein pneumatic pressurizing means are provided for controllably pressurizing the liquid in the hollow space.

21. An assembly according to claim 19, wherein means are provided for increasing the pressure of the liquid in the hollow space in an apportioned manner.

22. An assembly according to claim 19, wherein a storage tank and a valve are provided for controlling supply of pressurized liquid to the hollow space.

23. An assembly according to claim 23, wherein the liquid can be returned via the valve from the hollow space into the storage tank.

24. An assembly according to claim 22, wherein the liquid can be selectively alternately supplied to the hollow space and returned from the hollow space to the storage tank via the valve.

25. An assembly according to claim 19, wherein the hollow cylindrical tube forms a storage tank for the liquid.

26. An assembly according to claim 19, wherein said hollow structural member is a motor vehicle steering shaft which is subjected in use to torsional flexing.

* * * * *